(12) United States Patent
Lehmann

(10) Patent No.: US 8,360,527 B2
(45) Date of Patent: Jan. 29, 2013

(54) FITTING SYSTEM FOR A VEHICLE SEAT

(75) Inventor: Ulrich Lehmann, Alfter (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 360 days.

(21) Appl. No.: 12/672,915

(22) PCT Filed: May 26, 2009

(86) PCT No.: PCT/EP2009/003701
§ 371 (c)(1),
(2), (4) Date: Feb. 10, 2010

(87) PCT Pub. No.: WO2009/143999
PCT Pub. Date: Dec. 3, 2009

(65) Prior Publication Data
US 2011/0215626 A1     Sep. 8, 2011

(30) Foreign Application Priority Data
May 28, 2008    (DE) .......................... 10 2008 026 176

(51) Int. Cl.
*B60N 2/02* (2006.01)
(52) U.S. Cl. .................. 297/367; 297/378.12; 297/362; 297/353
(58) Field of Classification Search ............. 297/378.12, 297/367, 362, 353
See application file for complete search history.

(56) References Cited

U.S. PATENT DOCUMENTS

| | | | | |
|---|---|---|---|---|
| 6,007,153 A | * | 12/1999 | Benoit et al. | 297/378.12 |
| 6,164,723 A | * | 12/2000 | Ganot | 297/378.12 |
| 6,619,744 B2 | * | 9/2003 | Reubeuze | 297/378.12 |
| 7,036,885 B2 | * | 5/2006 | Ganot et al. | 297/378.12 |
| 7,328,954 B2 | * | 2/2008 | Sasaki et al. | 297/378.12 |
| 7,490,907 B2 | * | 2/2009 | Nagura et al. | 297/367 R |
| 7,686,398 B2 | * | 3/2010 | Yokoyama | 297/341 |
| 7,766,428 B2 | * | 8/2010 | Ng et al. | 297/367 R |
| 2002/0096924 A1 | | 7/2002 | Reubeuze | |
| 2006/0012232 A1 | * | 1/2006 | Coughlin et al. | 297/367 |
| 2007/0018492 A1 | * | 1/2007 | Becker et al. | 297/378.12 |
| 2009/0021062 A1 | | 1/2009 | Lehmann | |

FOREIGN PATENT DOCUMENTS

| | | |
|---|---|---|
| DE | 19831581 | 1/1999 |
| DE | 19915863 | 10/1999 |
| DE | 19956235 | 6/2001 |
| DE | 202005012733 | 12/2006 |
| DE | 102006044489 | 8/2007 |
| DE | 102006041917 | 1/2008 |
| EP | 0 705 727 B1 | 4/1996 |
| EP | 0 872 375 | 10/1998 |
| WO | WO 2007/087876 | 8/2007 |

* cited by examiner

*Primary Examiner* — Laurie Cranmer
(74) *Attorney, Agent, or Firm* — McGlew and Tuttle, P.C.

(57) ABSTRACT

A fitting system (5) is provided for a vehicle seat (1), with a first fitting (10) which, for unlocking purposes, has a driver (18) which is rotatable about an axis (A), and with a second fitting (20). A transmission element (25) is provided between the two fittings (10, 20). A free-pivoting device (24) is assigned to the second fitting (20). A first operating element (31) is provided, upon the actuation of which the two fittings (10, 20), with the use of the transmission element (25), are unlocked. A second operating element (32) is provided, upon the actuation of which the first fitting (10) and the free-pivoting device (24) are unlocked, The driver (18) of the first fitting (10) receives the transmission element (25)—coupled thereto for carrying along, wherein free travel in one direction of rotation is provided between the driver (18) and the transmission element (25).

18 Claims, 5 Drawing Sheets

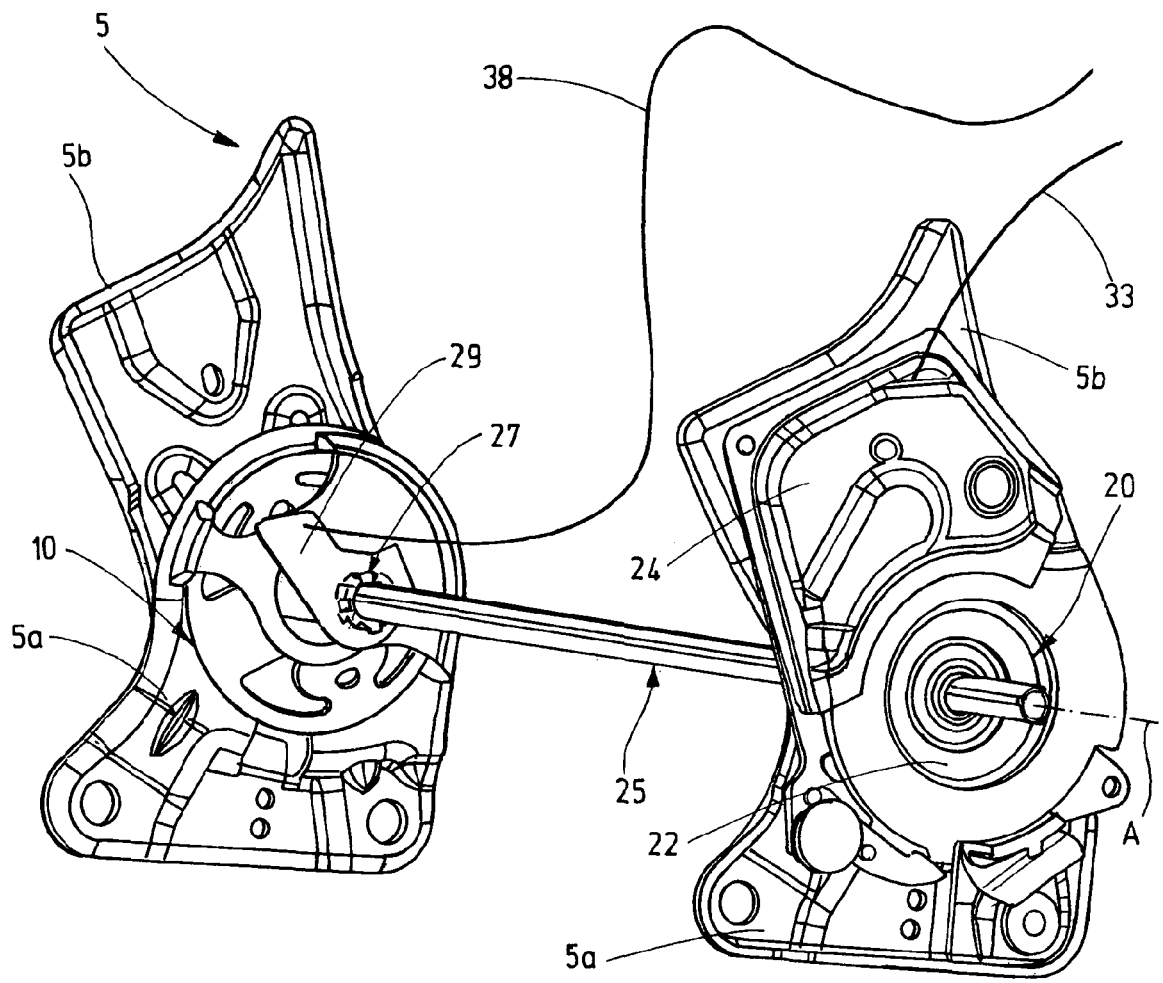
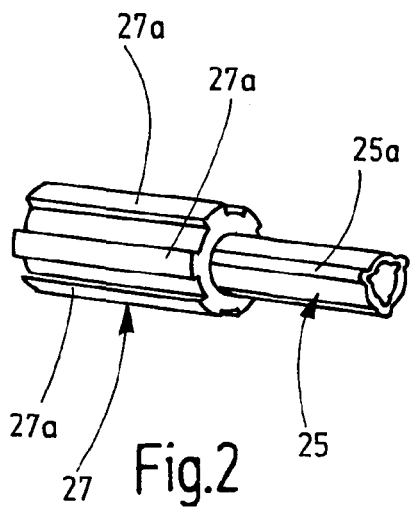
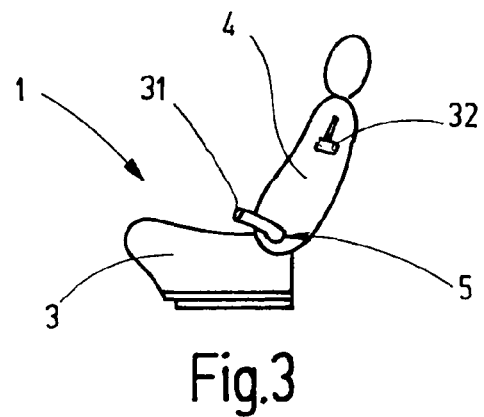

FITTING SYSTEM FOR A VEHICLE SEAT

CROSS REFERENCE TO RELATED APPLICATIONS

This application is a United States National Phase application of International Application PCT/EP2009/003701 and claims the benefit of priority under 35 U.S.C. §119 of German Patent Application DE 10 2008 026 176.9 filed May 28, 2008, the entire contents of which are incorporated herein by reference.

FIELD OF THE INVENTION

The invention relates to a fitting system for a vehicle seat with a first fitting, which has a driver that can be rotated about an axis for the purpose of unlocking, a second fitting, a transmission element between the two fittings, a free-pivoting device assigned to the second fitting, a first operating element, upon actuation of which the two fittings unlock and wherein the transmission element is used and a second operating element is provided upon actuation of which the first fitting and the free-pivoting device unlock.

BACKGROUND OF THE INVENTION

EP 0 705 727 B1 has disclosed a fitting system of this kind with a first fitting, a second fitting and a transmission element between the two fittings. Each fitting has a shaft piece, the rotation of which unlocks the fitting. To adjust the inclination of a backrest, the shaft piece is rotated by means of a first operating element on the second fitting, and a first lever seated thereon in a torsionally rigid manner is pivoted. The first lever takes along a second lever, which is connected in a torsionally rigid manner to the transmission element. The pivoting second lever rotates the transmission element, which transmits the rotary motion to the shaft piece of the first fitting. Both fittings unlock. To allow the backrest to be pivoted freely, the second fitting is assigned a free-pivoting device, which is locked by means of a pivotable pawl. The pawl is opened by means of a second operating element, and the pawl pivots the second lever by means of a cable pull as it pivots open. The pivoting second lever rotates the transmission element, which transmits the rotary motion to the shaft piece of the first fitting. The first fitting unlocks, while the second fitting remains locked. By means of the fitting system described, memorization of the backrest inclination is achieved. When the backrest is pivoted freely and then pivoted back, the previously set backrest inclination is re-assumed.

SUMMARY OF THE INVENTION

The object on which the invention is based is to improve a fitting system of the type stated at the outset and, in particular, to make it simpler and less costly.

According to the invention, a fitting system is provided comprising a first fitting with a driver that can be rotated about an axis for unlocking, a second fitting, a transmission element between the first fitting and the second fitting, a free-pivoting device assigned to the second fitting a first operating element which is actuatable for unlocking the first fitting and second fitting via the transmission element and a second operating element which is actuatable for unlocking the first fitting and the free-pivoting device. The driver of the first fitting is coupled to the transmission element for driving in one direction and for an amount of idle travel between the driver and the transmission element in one direction of rotation.

A simple means of decoupling is made available if the driver of the first fitting accommodates the transmission element in a manner which involves coupling for driving, while an idle travel is provided between the driver and the transmission element in one direction of rotation. Less installation space is required overall, and the construction of the fitting system is simplified. The idle travel is preferably greater than the unlocking travel of the driver required to unlock the first fitting, ensuring that there is complete decoupling. As the backrest pivots freely, the second fitting remains locked and thus stores the previously set inclination (memory function). The fitting system according to the invention is intended for a vehicle seat, the backrest of which is to be capable of being adjusted in terms of its inclination and pivoted freely while allowing memorization but should at the same time entail reduced production costs, and this is achieved by using just a single free-pivoting device in the fitting system.

In a preferred embodiment, the idle travel, i.e. the decoupling, is achieved by means of a splined-shaft profile between the transmission element and the driver, the longitudinal ribs of the transmission element and the edges of the hub receptacle of the driver being spaced apart in one direction of rotation in the starting position. It is preferred in this context that the transmission element and/or the driver should have a profile with three-fold symmetry. A profile of this kind is described, for example, in DE 10 2006 041 917 B3 (corresponding to US patent application US2009021062), the disclosure of which in this regard is incorporated expressly by reference. However, the idle travel according to the invention is significantly greater than a conventional play provided for the purpose of tolerance compensation. However, alternative decoupling options are also possible, using a hook and pin, for example.

In the case of decoupling from the transmission element, the driver is preferably actuated by means of a lever element, which can be rotated relative to the transmission element and is connected, in particular clipped, to the driver in a torsionally rigid manner. The lever element, which is arranged to the outside of the first fitting, has a larger radial dimension than the transmission element and, in particular, surrounds the transmission element. This ensures that the radial installation space to the outside of the first fitting is utilized. If the lever element does not have its own means of fastening a cable pull or the like, the second operating element preferably acts on the lever element by means of an unlocking lever, in particular by means of a cable pull which, on the one hand, is provided on the unlocking lever and, on the other hand, is in operative connection with the second operating element. The second operating element is preferably also in operative connection with the free-pivoting device by means of a further cable pull, it being possible for the two cable pulls mentioned to be in series or in parallel. A further splined-shaft profile can be provided to connect the lever element in a torsionally rigid manner to the driver and/or the unlocking lever.

The fitting system according to the invention is preferably designed in such a way that when the first operating element is actuated, the transmission element rotates and directly rotates the driver of the first fitting (and the driver of the second fitting), thereby making it possible to adjust the inclination with the fittings unlocked, while, when the second operating element is actuated, the transmission element remains unrotated and the second operating element rotates the driver of the first fitting, thereby making it possible to pivot the backrest freely with the first fitting unlocked and the free-pivoting device unlocked.

The invention is explained in greater detail below with reference to an exemplary embodiment illustrated in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of the exemplary embodiment according to the invention;

FIG. 2 is a perspective view of the lever element and of part of the transmission element;

FIG. 3 is a schematic representation of a vehicle seat;

DESCRIPTION OF THE PREFERRED EMBODIMENT

Figure 4:
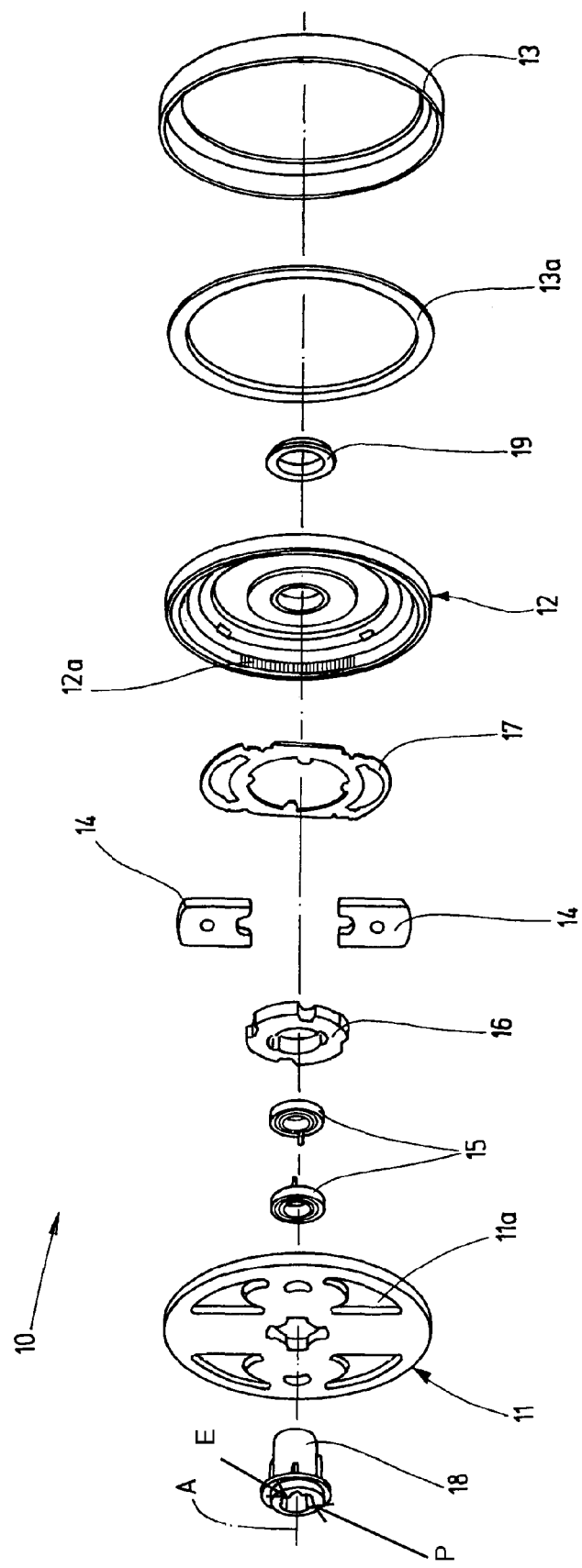
FIG. 4 is an exploded view of the first fitting.

Referring to the drawings in particular, a vehicle seat 1, which, in the present case, is provided as a front seat of a motor vehicle, has a seat part 3 and a backrest 4. By means of a fitting system 5, the back rest 4 can, on the one hand, be adjusted in terms of its inclination relative to the seat part 3, thereby defining a number of positions of use, and on the other hand can be pivoted freely, that is to say can be pivoted forward into an out-of-use position in order, for example, to make it easier to get to a rear row of seats. On each side of the vehicle seat, the fitting system 5 has a fitting, which is constructed and coupled together in the manner described below.

A first fitting 10, which is designed as a latching fitting, has a first fitting part 11 and a second fitting part 12, which can be rotated about an axis A relative to the first fitting part 11. The axis A defines a cylindrical coordinate system, which is used below. Fitting parts 11 and 12 are both of disc-shaped design, for example, and are held together in the axial direction by a clasp ring 13, which is firmly connected to the first fitting part 11 and fits radially over the second fitting part 12 with a damper ring 13a in between. From the point of view of construction, the first fitting 10 thus forms a disc-shaped unit.

The first fitting part 11 has a plurality of axially protruding guide and bearing segments 11a, in the present case four such segments, which, on the one hand, support the second fitting part 12 on their radially outward-facing, cylindrically curved surface and, on the other hand, guide at least one locking bar 14 pairwise between them, in the present case a total of two locking bars 14, with the possibility of radial movement. As an internally toothed circumferential boundary surface of a cup-like depression, the second fitting part 12 has a toothed ring 12a, by means of which the second fitting part 12 is, on the one hand, supported on the guide and bearing segments 11a and, on the other hand, interacts with the externally toothed locking bars 14 in order to lock the first fitting 10.

In order to push the locking bars 14 radially outward into the toothed ring 12a for the purpose of locking, an eccentric 16 preloaded by springs 15 is provided, the said eccentric being arranged in the center between the guide and bearing segments 11a in such a way that it can be rotated about the axis A. To pull the locking bars 14 radially inward for the purpose of unlocking the first fitting 10, with the result that they disengage from the toothed ring 12a, a control disc 17 is provided, this being arranged axially between the guide and bearing segments 11a and the second fitting part 12. The control disc 17 interacts with the locking bars 14, in the present case by the engagement of axially protruding lugs on the locking bars 14 in guide slots in the control disc 17. In the present case, the control disc 17 is seated in a torsionally rigid manner on the eccentric 16, which can be rotated by means of a driver 18 against the force of the springs 15, although, in a modified form, it could also be seated directly on the driver 18.

The driver 18, which is supported so as to be rotatable about the axis A, can rotate the control disc 17 by an angle corresponding to the length of the guide slot, in the present case by about 30°. The driver 18, which is preferably composed of plastic, is inserted through central openings in the two fitting parts 11 and 12, which simultaneously serve to support it, and through the eccentric 16 so as to give coupling for driving, insertion taking place in the present case from that side of the first fitting part 11 which faces away from the second fitting part 12, and is secured in the axial direction by a retention ring 19 which is arranged on that side of the second fitting part 12 which faces away from the first fitting part 11 and, preferably being made of plastic, is preferably clipped on to the driver 18.

A fitting bottom part 5a fixed to the first fitting part 11 connects the first fitting 10 to the seat part, while a fitting top part 5b fixed to the second fitting part 12 connects the first fitting 10 to the backrest 4.

A second fitting 20 on the opposite side of the vehicle seat also has the components described above, and its first fitting part 21 is fixed to the fitting bottom part 5a, but the fitting top part 5b is supported rotatably on the second fitting 20, preferably on the second fitting part 22 of the latter, and can be locked to its second fitting part 22. The elements of a locking device which are provided for this purpose and the modification of the fitting top part 5b and, where appropriate, of the second fitting part 22 define a free-pivoting device 24 associated with the second fitting 20. The fundamental structure of a free-pivoting device 24 of this kind is known, for example, from DE 10 2006 044 490 A1 (corresponding to U.S. Pat. No. 7,571,962) for a geared fitting.

A ring-shaped latching element 24a on the second fitting part 22 provides pivot-mounting for the fitting top part 5b. For this purpose, the latching element 24a has a collar, for example, and on this collar the fitting top part 5b can be pivotably mounted by means of a bearing opening, which can likewise be in the form of a collar. The latching element 24a is firmly connected, either directly or indirectly, to the second fitting part 22, for example by means of a laser weld (or in some other way). A ring-shaped fastening disc, which fits over the fitting top part 5b in the bearing area, can be firmly connected to the latching element 24a and optionally to the second fitting part 22 to secure the said top part 5b axially. There is a certain bearing play in the radial direction. The fitting top part 5b can comprise two parts fixed to one another, one of which is supported on the latching element 24a and the other is connected as an adaptor to the backrest 4.

A pawl 24b is mounted pivotably on the fitting top part 5b on the side facing the latching element 24a by means of a bearing pin, referred to below as pawl bearing pin 24bb. To lock and limit the forward pivoting motion of the fitting top part 5b in the event of a (frontal) collision, a latching stop is provided, preferably formed integrally, on the latching element 24a as a radial extension of the pawl 24b, the latching stop being in the form of a nose in the present case. The pawl bearing pin 24bb is designed as an eccentric pin, i.e. it is supported in the fitting top part 5b in such a way that it can be rotated relative to the latter about an axis which is offset with respect to the pivoting axis of the pawl 24b. To compensate for manufacturing tolerances, the pawl bearing pin 24bb is adjusted and fixed in such a way that the pawl 24b rests with maximum pawl engagement and without play against the latching stop of the latching element 24a, this being outside the angular range for self locking however.

To keep the pawl 24b in latching engagement with the latching element 24a, a clamping element 24c and a catch element 24d are provided as retention elements. An unlocking shaft 24e is supported rotatably and in parallel with the pawl bearing pin 24bb in the fitting top part 5b by means of a bearing bush 24ee. The clamping element 24c is seated pivotably on the unlocking shaft 24e, and the catch element 24d is seated in a torsionally rigid manner on the same shaft. The catch element 24d and the clamping element 24c can be pivoted about the common axis defined by the unlocking shaft 24e and are aligned with the pawl 24b when the fitting top part 5b is unlocked. The operation of the catch element 24d and the clamping element 24c is described in DE 44 39 644 A1 (corresponding to U.S. Pat. No. 4,223,947), the disclosure of which in this regard is incorporated expressly by reference.

The clamping element 24c rests on a contact surface of the pawl 24b at an angle outside the self-locking range by means of a clamping surface which is curved eccentrically relative to the unlocking shaft 24e. The clamping element 24c is preloaded by a clamping spring 24cc designed as a spiral spring, with the result that it acts upon the pawl 24b (and clamps the latter against the latching stop of the latching element 25a). The fitting top part 5b is thereby locked without play to the latching element 24a and hence to the second fitting part 22. The catch element 24d is acted upon by a catch spring 24dd designed as a helical tension spring and rests against a stop of the fitting top part 5b. Normally, i.e. for normal use of the seat, the pawl 24b is held in its position by the clamping element 24c, and the catch element 24d is arranged at a short distance from the pawl 24b. In the event of a collision, when collision forces act on the pawl 24b, the clamping element 24c may open owing to the lack of self-locking. After a slight pivoting motion of the pawl 24b, the said pawl comes to rest against the catch element 24d. The catch element 24d then supports the pawl 24b, which rests against the catch element 24d within the self-locking range, preferably resting against it tangentially or concentrically and as far as possible over a flat area. This prevents the pawl 24b from opening (further).

The catch element 24d and the clamping element 24c are coupled to one another for driving by means of a slot-and-pin guide with an idle travel. For this purpose, the clamping element 24c has a slot, which is curved around the unlocking shaft 24e and in which a pin of the catch element 24d engages. A cover 24f attached to the fitting top part 5b covers the pawl 24b together with the pawl bearing pin 24bb, the catch element 24d, the clamping element 24c and the springs 24cc and 24dd, and protects them from getting dirty.

Figure 6:
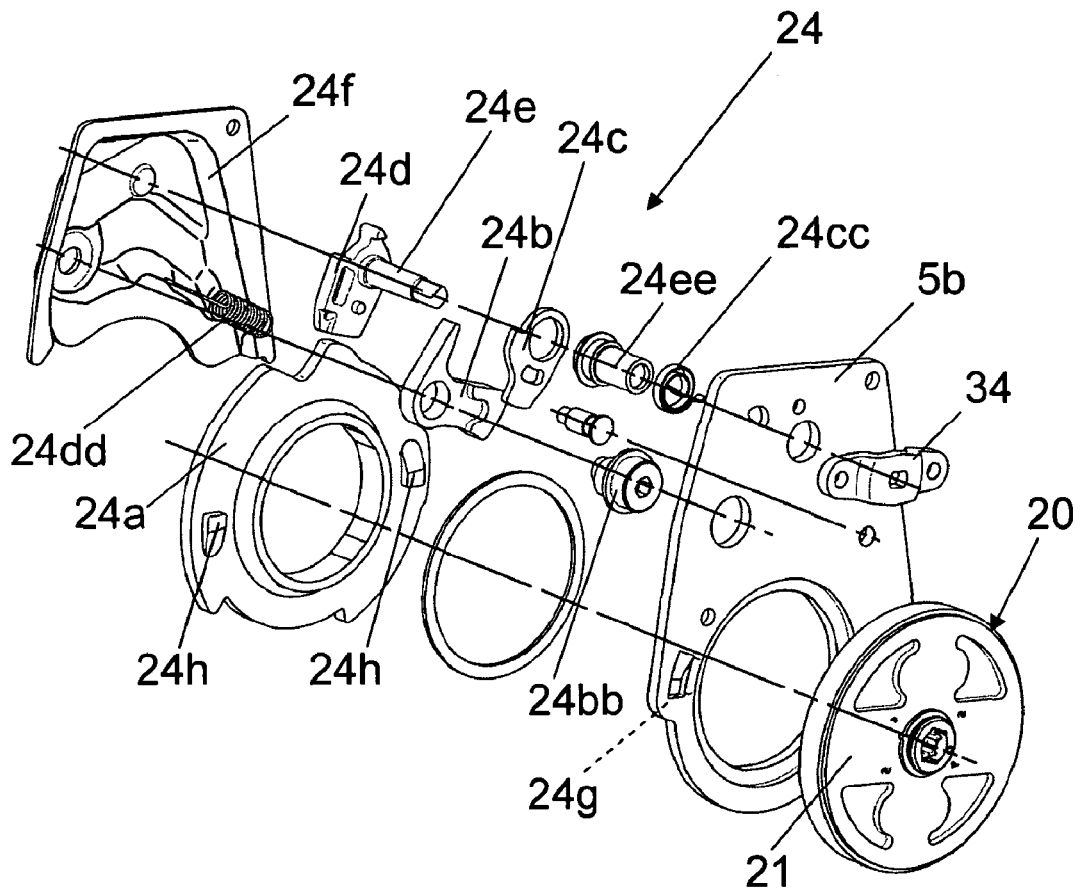
FIG. 6 is an exploded view of the free-pivoting device.

As a stop acting in the rearward pivoting direction of the backrest 4 (clockwise in FIGS. 1 and 3; anticlockwise in FIG. 6), the fitting top part 5b has at least one first stop dog 24g, in the present case two stop dogs lying diagonally opposite relative to the axis A, and the latching element 24a has the same number of second stop dogs 24h arranged in a corresponding way. Each first stop dog 24g, which has a first stop surface facing in the rearward pivoting direction, interacts with just one second stop dog 24h, which has a second stop surface facing in the forward pivoting direction. The stop dogs 24g and 24h, which are distributed in pairs in the circumferential direction, are arranged at a radial distance from the axis A, are formed by a tongue-shaped axial protrusion in the material, each facing the other, and face one another in the circumferential direction with their stop surfaces, which are situated at the ends, on the free end of the tongues.

While known stops project radially beyond the outer edge of the associated component, the stop dogs 24g and 24h project only axially, i.e. they are arranged radially within the outer edge of the associated component. The stop dogs 24g and 24h are made to protrude in such a way that their stop surfaces project as far as possible into the interspace which is preferably present between the fitting top part 5b and the latching element 24a. The protrusions give rise to a depression in the material on the rear side in each case. The stop surfaces extend in the axial and radial direction, i.e. without a component in the circumferential direction, enabling them to transmit the forces in an optimum manner in the event of contact. The stop formed by the stop dogs 24g and 24h limits the rearward pivoting motion of the fitting top part 5b unilaterally, both in the normal case after free pivoting and in the case of a (rear) collision.

To unlock the free-pivoting device 24 at the beginning of free pivoting, the unlocking shaft 24e is rotated about its own axis. The unlocking shaft 24e takes the catch element 24d along in order to open it, i.e. it separates it and/or removes it from the pawl 24b. During this process, the catch element 24d takes the clamping element 24c along by means of the slot-and-pin guide in order to release the pawl 24b. The pivoting catch element 24d comes to rest against a—substantially radially projecting—unlocking finger of the pawl 24b and thereby pulls the pawl open or assists it in opening. The pawl 24b is thus fully open.

In order to limit the adjustment range when adjusting the inclination, i.e. the relative rotation of the second fitting part 22 and of the fitting bottom part 5a, there is a blocking stop projecting in parallel with the axis A from the fitting bottom part 5a, the said stop being accommodated between two limiting stops of the latching element 24a. By interacting with a corresponding limiting stop on the fitting top part 5b, the blocking stop can also limit the free pivoting of the backrest 4, i.e. the forward pivoting motion of the fitting top part 5b.

Figure 5:
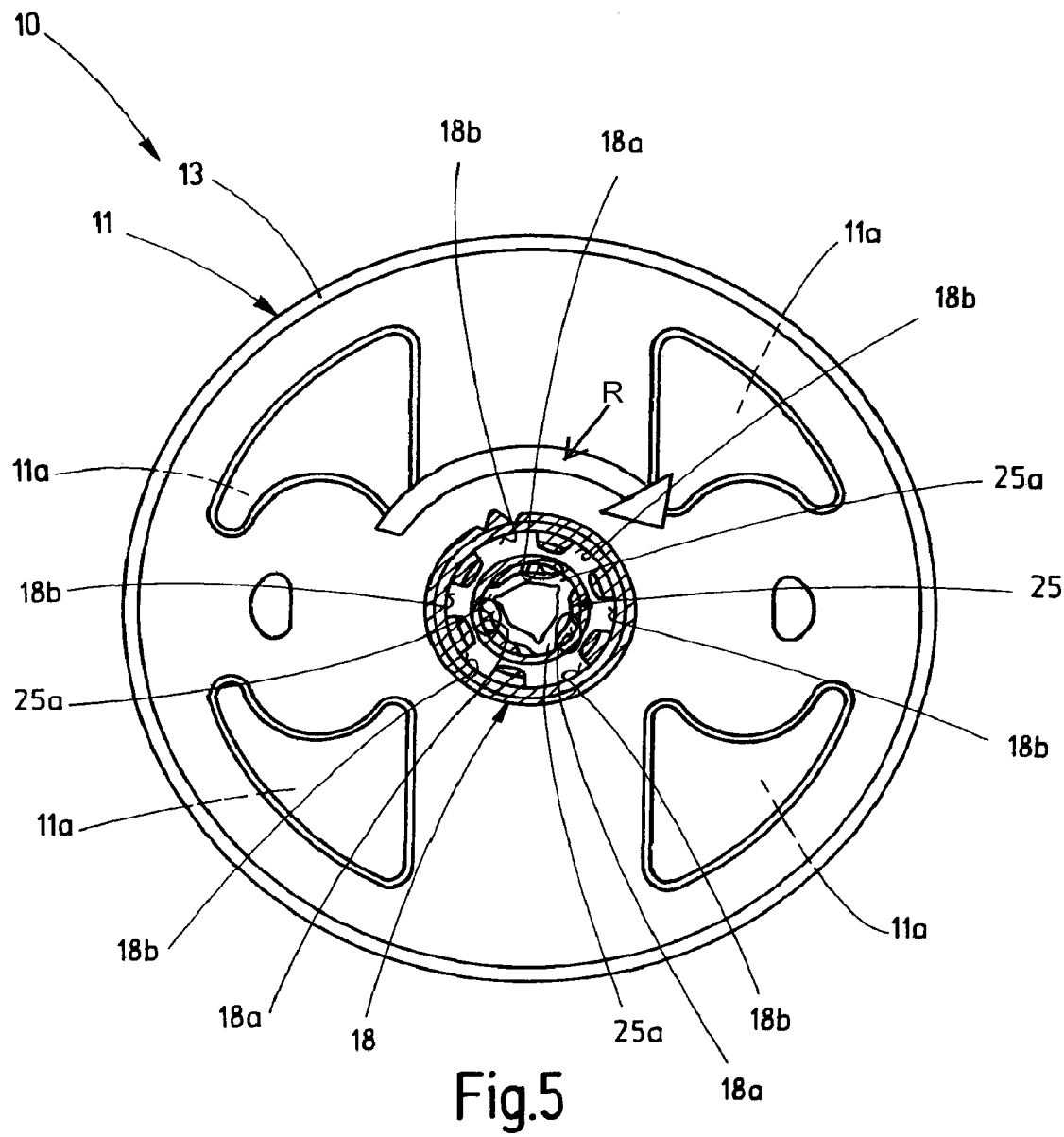
FIG. 5 is a side view of the first fitting, those parts of the driver which project axially beyond the first fitting part being hatched.
Figure 5A:
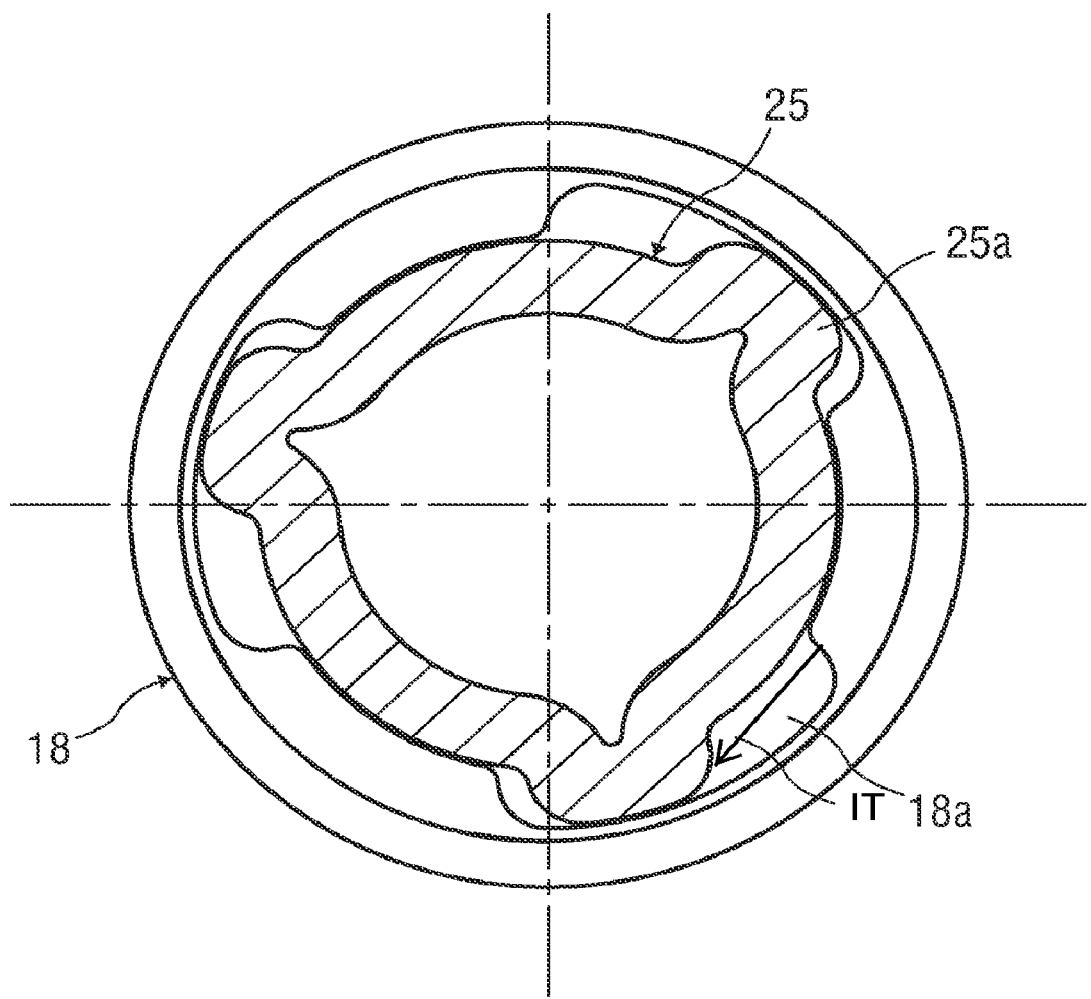
FIG. 5A is an enlarged side view of the driver and the transmission element shown in FIG. 5.

The two fittings 10 and 20 of the fitting system 5 are coupled by a transmission element 25 which, in the present case, is designed as a rod which is in alignment with the axis A and can be rotated about the latter. The transmission element 25 is accommodated by the respective driver 18, in the present case being coupled to it for driving by means of a splined-shaft profile. For this purpose, the transmission element 25 has a profile with three-fold symmetry with three longitudinal ribs 25a, offset by 120° relative to one another in the circumferential direction, which engage in respective hub receptacles 18a (also with three-fold symmetry) of the driver 18, which is designed as a hub, with an inner hub profile P, in this respect. At least in the case of the first fitting 10, an idle travel IT ("decoupling angle") is provided between the transmission element 25 and the driver 18 in one direction of rotation R, i.e. the longitudinal rib 25a and the edge E of the hub receptacle 18a are spaced apart over a certain angle—about 30° in the present case—in the starting position (the starting position is shown in FIG. 5). The idle travel IT is greater than the unlocking travel of the driver 18 required to unlock the first fitting 10. This idle travel IT is shown by the arrow in the enlarged view of FIG. 5A. There is no idle travel in the other direction of rotation in the starting position. In the case of the driver 18 of the second fitting 20, the idle travel is optional. In that case, it is also possible for a torsionally rigid connection between the driver 18 and the transmission element 25 to be provided in both directions of rotation.

In the area of its flange, in which it rests against the side of the first fitting part 11, the radius of this area being greater than that of the hub, at least the driver 18 of the first fitting 10 is designed to accommodate a lever element 27 in a torsionally rigid manner. The basic shape of the lever element 27 is that of a hollow cylinder with a larger radial dimension than the transmission element 25, and the lever element surrounds the transmission element 25 while being free to rotate. To form another splined-shaft profile, the lever element 27 has a plurality of radially projecting longitudinal ribs 27a, in this case six such ribs, on its circumferential surface, while the driver 18 has a corresponding number of lever receptacles 18b in the said flange area. The driver 18 and the lever element 27, which is preferably made of plastic, can be designed to give a clip-on connection when the longitudinal ribs 27a are introduced into the lever receptacles 18b. The axial dimension of the lever receptacles 18b corresponds to the amount by which the driver 18 projects axially beyond the side of the first fitting part 11, while the lever element 27—and hence also its longitudinal ribs 27a—have a greater axial length, i.e. project beyond the driver 18. An unlocking lever 29 is seated in a torsionally rigid manner on the lever element 27 in this projecting region, for which purpose the unlocking lever 29 has a corresponding internal splined-shaft profile in order to accommodate the longitudinal ribs 27a of the lever element 27. In an alternative embodiment, the unlocking lever 29 and the lever element 27 are of one-piece design.

Two operating elements are provided in accordance with the two functions of the fitting system 5. A first operating element 31, for example a lever, a hand wheel or a loop is seated—in a position axially to the outside of the two fittings 10 and 20—in a torsionally rigid manner on the transmission element 25 or subjects the latter—at least indirectly—to a torque. If the first operating element 31 is moved, in particular if it is pivoted upward, the transmission element 25 rotates about the axis A, rotating clockwise in FIG. 5. In the case of both fittings 10 and 20, the driver 18 is taken along immediately, whereupon the eccentric 16 and the control disc 17 are rotated and the locking bars 14 are pulled radially inward. The second fitting parts 12 and 22 can now be pivoted into a different position of use. Once the desired new inclination of the backrest 4 has been reached, the first operating element 31 is released, whereupon the springs 15 rotate the eccentric 16 back and, on the one hand, push the locking bars 14 radially outward so that they enter the toothed ring 12a and, on the other hand, rotate the driver 18 and the transmission element 25 back.

Figure 7:
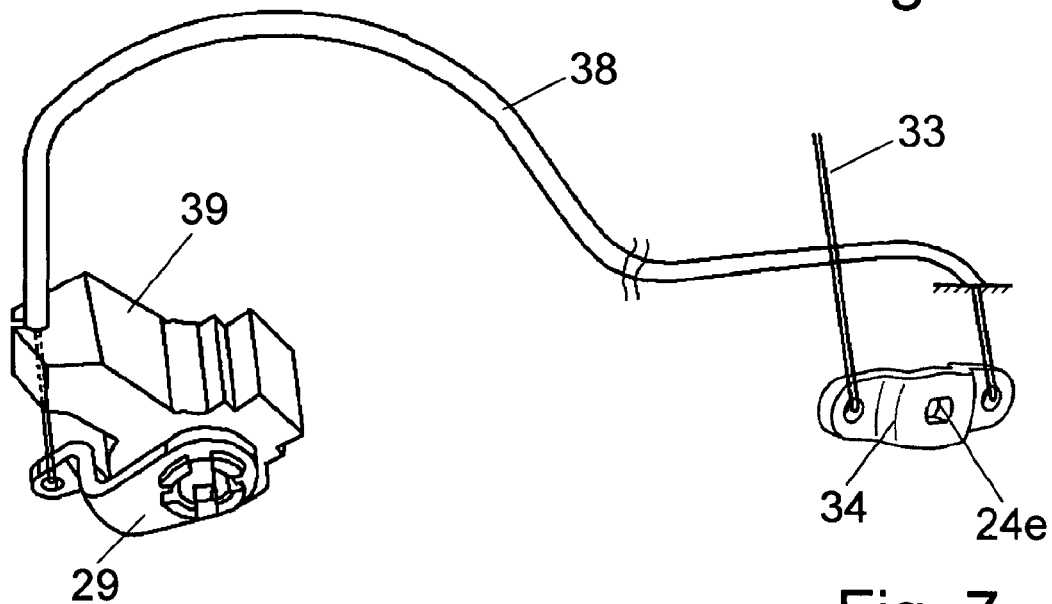
FIG. 7 is those parts which are in operative connection with the second operating element.

A second operating element 32, which is preferably arranged in the upper region of the backrest 4, is in operative connection, by means of a first cable pull 33, with the free-pivoting device 24 assigned to the second fitting 20, more precisely with a free-pivoting lever 34 which is seated in a torsionally rigid manner on the unlocking shaft 24e. The free-pivoting lever 34, in turn, is in operative connection with the unlocking lever 29 of the first fitting 10 by means of a second cable pull 38. The second cable pull 38 is, for example, a Bowden cable, the sheath of which is supported, at one end, on the second fitting 20, for example on the free-pivoting device 24, and, at the other end, on the first fitting 10, for example a top-mounted part 39 of the latter, as shown in FIG. 7. In this regard, FIG. 1 gives only a schematic representation. If the second operating element 32 is moved, in particular pulled upward, what happens is therefore that, on the one hand, the free-pivoting lever 34 is pivoted, thereby unlocking the free-pivoting device 24, and, on the other hand, the unlocking lever 29 is pivoted. The pivoting unlocking lever 29 rotates the lever element 27, which, for its part, rotates the driver 18 of the first fitting 10, this being in a clockwise direction in FIG. 5, with the result that—as described above—the first fitting 10 is unlocked. Since the rotation of the driver 18 relative to the transmission element 25 now takes place in the opposite sense (clockwise in FIG. 5), the idle travel is performed, i.e. the transmission element 25 remains unrotated in its starting position. As a result, the driver 18 of the second fitting 20 also remains unrotated, with the result that the second fitting 20 remains locked. The backrest 5 can be pivoted freely forward with the unlocked first fitting 10 and the unlocked free-pivoting device 24. When the backrest 4 is pivoted back and reaches the previously assumed position of use, the free-pivoting device 24 locks, as a result of which the free-pivoting lever 34 is pivoted back, with the result that the driver 18 can rotate back and the first fitting 10 thus locks again.

While a specific embodiment of the invention has been described in detail to illustrate the application of the principles of the invention, it will be understood that the invention may be embodied otherwise without departing from such principles.

The invention claimed is:

1. A fitting system for a vehicle seat, the fitting system comprising:
    a first fitting with a driver that is rotated about an axis on an unlocking travel for an unlocking of the first fitting:
    a second fitting;
    a transmission element between the two fittings;
    a free-pivoting device assigned to the second fitting;
    a first operating element, upon actuation of which the two fittings unlock via the transmission element;
    a second operating element, upon actuation of which the first fitting and the free-pivoting device unlock wherein:
    the driver of the first fitting accommodates the transmission element in a manner which involves coupling for driving, with an idle travel of the driver being provided between the driver and the transmission element in one direction of rotation; and
    the idle travel is greater than the unlocking travel of the driver required to unlock the first fitting.

2. A fitting system according to claim 1, wherein:
    a splined-shaft profile is provided between the transmission element and the driver;
    longitudinal ribs of the transmission element and edges of a hub receptacle of the driver are spaced apart in one direction of rotation in a starting position.

3. A fitting system according to claim 1, wherein the transmission element and/or the driver have a profile with threefold symmetry with three longitudinal ribs which engage in respective hub receptacles of the driver.

4. A fitting system according to claim 1, further comprising a lever element, which can be rotated relative to the transmission element and is clipped, to the driver in a torsionally rigid manner.

5. A fitting system according to claim 4, wherein the lever element has a larger radial dimension than the transmission element and, in particular, surrounds the transmission element.

6. A fitting system according to claim 4, wherein the second operating element acts on the lever element by means of an unlocking lever.

7. A fitting system according to claim 6, wherein the unlocking lever is connected in a torsionally rigid manner to the lever element, by one of being integral or being connected by a splined-shaft profile.

8. A fitting system according to claim 1, wherein the second operating element is in operative connection with the free-pivoting device by means of a cable pull.

9. A fitting system according to claim 1, wherein, when the first operating element is actuated, the transmission element rotates and rotates the driver of the first fitting while, when the second operating element is actuated, the transmission element remains unrotated and the driver of the first fitting is rotated.

10. A motor-vehicle seat comprising: a seat part a backrest, wherein the backrest is adjustable in terms of inclination relative to the seat part and can be pivoted freely by means of a fitting system, the fitting system comprising:
    a first fitting with a driver that is rotated about an axis on an unlocking travel for an unlocking of the first fitting;
    a second fitting;
    a transmission element between the first fitting and the second fitting;
    a free-pivoting device assigned to the second fitting;
    a first operating element which is actuatable for unlocking the first fitting and second fitting via the transmission element;
    a second operating element which is actuatable for unlocking the first fitting and the free-pivoting device, the driver of the first fitting being coupled to the transmission element for driving in one direction of rotation and for an amount of idle travel of the driver, between the driver and the transmission element, in the one direction of rotation and with the idle travel being greater than the unlocking travel of the driver required to unlock the first fitting.

11. A vehicle seat according to claim 10, wherein:
    a splined-shaft profile is provided between the transmission element and the driver;
    longitudinal ribs of the transmission element and edges of a hub receptacle of the driver are spaced apart in one direction of rotation in a starting position.

12. A vehicle seat according to claim 10, wherein the transmission element and/or the driver have a profile with three-fold symmetry.

13. A vehicle seat according to claim 10, further comprising a lever element for rotation relative to the transmission element, the lever element being connected to the driver in a torsionally rigid manner.

14. A vehicle seat according to claim 13, wherein the lever element has a larger radial dimension than the transmission element and, in particular, surrounds the transmission element.

15. A vehicle seat according to claim 13, wherein the second operating element acts on the lever element by means of an unlocking lever.

16. A vehicle seat according to claim 15, wherein the unlocking lever is connected in a torsionally rigid manner to the lever element, by one of being integral or being connected by a splined-shaft profile.

17. A vehicle seat according to claim 10, wherein the second operating element is in operative connection with the free-pivoting device by means of a cable pull.

18. A vehicle seat according to claim 10, wherein, when the first operating element is actuated, the transmission element rotates and rotates the driver of the first fitting while, when the second operating element is actuated, the transmission element remains unrotated and the driver of the first fitting is rotated.

\* \* \* \* \*